United States Patent [19]

Nakamura et al.

[11] Patent Number: 4,608,459
[45] Date of Patent: Aug. 26, 1986

[54] TELEPHONE ANSWERING DEVICE

[75] Inventors: Keiichi Nakamura, Tama; Hideyuki Horiuchi, Tokyo, both of Japan

[73] Assignee: Tandy Corporation, Fort Worth, Tex.

[21] Appl. No.: 632,539

[22] Filed: Aug. 24, 1984

Related U.S. Application Data

[62] Division of Ser. No. 324,154, Nov. 23, 1981, Pat. No. 4,469,919.

[30] Foreign Application Priority Data

| Feb. 20, 1981 | [JP] | Japan | 56-23928 |
| Feb. 20, 1981 | [JP] | Japan | 56-23929 |
| Feb. 20, 1981 | [JP] | Japan | 56-23930 |
| Feb. 20, 1981 | [JP] | Japan | 56-23931 |
| Mar. 23, 1981 | [JP] | Japan | 56-41893 |
| Mar. 23, 1981 | [JP] | Japan | 56-41894 |
| Mar. 31, 1981 | [JP] | Japan | 56-47688 |

[51] Int. Cl.$^4$ .............................. H04M 1/64
[52] U.S. Cl. ..................... 179/6.03; 179/6.01
[58] Field of Search ............... 179/6.07, 6.11, 6.17, 179/6.18, 6.20, 6.01, 6.03; 369/27, 28, 29; 360/72.2, 72.3, 72.1

[56] References Cited

U.S. PATENT DOCUMENTS

| 3,728,486 | 4/1973 | Kraus | 179/6.17 |
| 3,812,532 | 5/1974 | Crosser et al. | 360/72.3 |
| 3,894,188 | 7/1975 | Konno | 179/6.11 |
| 3,931,470 | 1/1976 | Zimmermann | 179/6.11 |
| 3,935,389 | 1/1976 | Waldman | 179/6.11 |
| 4,150,405 | 4/1979 | Sato | 360/72.3 |
| 4,221,933 | 9/1980 | Cornell et al. | 179/6.17 |
| 4,319,089 | 3/1982 | Miller | 179/6.11 |
| 4,338,639 | 7/1982 | Fujibayashi | 369/28 |
| 4,436,959 | 3/1984 | Nakatsuyama et al. | 179/6.11 |

OTHER PUBLICATIONS

Hanson et al., "New Custom Calling Services", Bell Laboratories Record, Jun. 1980, vol. 58, No. 6, pp. 174, 176-180.

Primary Examiner—Donald McElheny, Jr.
Attorney, Agent, or Firm—Wolf, Greenfield & Sacks

[57] ABSTRACT

A microprocessor controlled telephone answering device displays a message number and the date and time received for each recorded message as the message is played back. Other features include a cue function for selecting messages as they are played back. The answering device can automatically rewind back and locate a cued message to replay that selected message. Also, digital function codes can be transmitted over a telephone by a remote control unit to control a large number of answering device functions from a remote location. Additional features include the capability for easily entering a new security code into both the answering device and the remote control unit.

17 Claims, 19 Drawing Figures

TELEPHONE ANSWERING DEVICE

This application is a division of application Ser. No. 324,154, filed Nov. 23, 1981, now U.S. Pat. No. 4,469,919.

BACKGROUND OF THE INVENTION

1. Related Applications

Claim of priority is made for the present invention pursuant to 35 U.S.C. §119 to obtain the benefit of the earlier filing dates in Japan of the following Japanese applications:

"Recording Tape Information Code System," filed Feb. 20, 1981, application number 56-23928;

"Remote Control Code System," filed Feb. 20, 1981, application number 56-23929;

"Recording Tape Residual Quantity Sensing Apparatus of Automatic Telephone Answering Device," filed Feb. 20, 1981, application number 56-23930;

"Automatic Answering and Recording Apparatus," filed Feb. 20, 1981, application number 56-23931;

"Message Selection System for Automatic Recording Apparatus," filed Mar. 23, 1981, application number 56-41893;

"Latest Recorded Information Discriminating System," filed Mar. 23, 1981, application number 56-41894; and "Message Recording System," filed Mar. 31, 1981, application number 56-47688.

2. Field of the Invention

The present invention relates to telephone answering devices, and more particularly, to a telephone answering device which is fully controlled by a microprocessor. In addition to controlling all the standard telephone answering device functions, the microprocessor enables the implementation of a variety of novel features which significantly increase the usefulness as well as convenience of a telephone answering device. These additional features are accomplished without adding significant complexity to the design of the device.

Telephone answering devices often use two separate cassette-type tape recorder/playback apparatuses (hereinafter "tape drives"). One tape drive is used to play back a prerecorded outgoing message or announcement from one of the cassettes when a call is received. The announcement typically states that the person is unavailable to come to the phone and that a message may be recorded at the sound of a tone. When the caller hears the tone, he then dictates his message into the phone, which is recorded by the second or incoming message tape drive onto the second cassette tape. After the incoming message is completed (or when the time allotted for the message has expired), the incoming message tape drive stops. The answering device then waits until a new incoming message is received at which time the incoming message tape drive is restarted. Each incoming message is sequentially recorded on the incoming message cassette tape until the incoming message tape is full or until the user returns to play back the recorded messages. To listen to the recorded messages, the user rewinds the incoming message tape to the beginning of the tape and then places the second tape drive into the playback mode. Each recorded message is then sequentially played back in the order in which it was received.

3. Description of the Prior Art

It is often highly desirable to know the exact date and time that a particular message is received. This information is generally not provided by typical prior art telephone answering devices. For example, U.S. Pat. No. 3,925,617 to Sato suggests automatically recording a voice time-of-day signal from a radio onto a single track incoming message tape at preset intervals (e.g., every 30 minutes). This time recording is inhibited when an incoming message is being recorded. Thus the incoming message tape apparently contains consecutive voice time signals interspaced between the recorded incoming messages. The time signal is not triggered by receipt of a call, hence it is not possible to determine the exact time within the preset intervals that a particular message was received. Another device which records time-of-day signals is suggested in U.S. Pat. No. 3,372,240 to Boyers.

It is an object of the present invention to provide a telephone answering device which automatically records date and time information indicating when a message is received, and which displays such time and date as that particular message is being played back.

Another problem encountered with previous telephone answering devices is that after all the messages have been played back, the user often desires to play particular messages again which he may have found interesting. In order to do this with many prior art answering telephone answering devices, the user rewinds the incoming message tape to where he believes is the approximate location of the desired message. The tape is then played back at that point until the user recognizes whether or not the message being played is the desired message. If not, the user then rewinds or fast forwards the message tape a certain distance and plays the tape again. The user continues in this trial and error method until the desired message is found. The user then attempts to find the beginning of that message.

In order to aid the user in finding a particular message, it has been proposed in U.S. Pat. No. 3,141,931 to Zarouni to prerecord message numbers, usually by voice, on a separate track of the incoming message tape. However, since the message numbers are prerecorded, this necessitates that the space provided for each message on the incoming message tape be fixed. Since actual messages are variable in length, the unused tape between messages is wasted. Furthermore, during playback, the user is required to wait during this dead space for the next message to begin or otherwise must interrupt the playback mode to fast forward the incoming message recorder to the beginning of the next message. In addition, the user is still required to monitor the message number track and rewind and fast forward until the desired message is found.

Other telephone answering devices have mechanical counters which incrementally move a message number wheel each time a message is received. When a playback key is depressed, the tape is automatically rewound to the beginning of the tape which resets the message number wheel to message number "one." The tape is then played back with the message number wheel indicating the message number of each message as it is played. Again, the user must manually rewind and fast forward until the desired message is found.

It is an object of the present invention to provide an improved telephone answering device which can automatically locate and playback messages preselected by the user.

It is another object of the present invention to provide an improved message numbering scheme for a telephone answering device for automatic control of the playback of the messages.

The functions of "playback", "rewind", "fast forward", "stop", etc. are typically controlled by keys or switches physically located on the telephone answering device itself. Some answering devices have the capability of having a few of these function operated from a remote location. The user, when absent from his answering device, can call and control these functions of the device over the telephone. Prior art telephone answering devices are typically controlled over the telephone by a set of audio tones each of which has a unique frequency. Each function is usually assigned one frequency (or combination of frequencies). The telephone answering device, upon receipt of a particular frequency (or combination of frequencies) activates the corresponding function.

The tones are typically generated by depressing the buttons of a "touch tone" phone (U.S. Pat. Nos. 3,141,931 to Zarouni and 3,904,826 to Murata et al.) or by a separate remote control unit or "beeper" which the user places near the mouthpiece of the phone. In either case, the telephone answering device usually has relatively complex tone discrimination circuits to determine which tone of the set of control tones was sent, and to activate the corresponding function. Generally, the more functions that are controlled, the greater the number of tones required and consequently, the greater the complexity of the tone discrimination circuits in the telephone answering device.

It is an object of the present invention, to provide a relatively simple system for operating a telephone answering device from a remote location yet which is capable of controlling a large number of telephone answering device functions.

In order to prevent unauthorized persons from playing back the recorded messages over the telephone, many telephone answering devices require the receipt of a particular security code before the telephone answering device will respond to remote control. For example, U.S. Pat. No. 4,196,311 to Hoven suggests transmitting a binary security code from the remote control unit to the telephone answering device. The particular binary code sent is set by the positions of a number of switches located on the remote control unit. The telephone answering device has a similar number of switches which must be set to the identical positions of the switches on the remote control unit. Thus if one or more switches on the telephone answering device is inadvertently set incorrectly, then the telephone answering device can not respond to the remote control unit.

It is an object of the present invention to provide a simple method of entering a new security code which is displayed as it is entered.

It is another object of the present invention to provide a remote control unit and telephone answering device system in which a new security code entered into the telephone answering device is automatically transmitted to the remote control device as well.

SUMMARY OF THE INVENTION

These and other objects and advantages are provided by a microprocessor controlled telephone answering device which has a dual track cassette tape recorder/playback apparatus for recording incoming messages. The messages left by the callers are recorded on one track of the cassette tape. Digital signals which represent the date and time that a particular message is received, are recorded on the other track while the caller's message is being recorded on the first track. During playback of the messages, the digital signals are read off the second track while the user listens to the messages on the first track. The processor of the answering device inputs these digital signals and displays the date and time information for a particular message on a digital display while the user is listening to that particular message. In this manner, the user may learn when each message was recorded.

In another aspect of the present invention, a message number is assigned to each incoming message and is recorded in digital form on the second track (in addition to the date and time digital signals) while the caller's message is recorded on the first track. These message number digital signals may also be inputted by the processor to display the message number while the message is being heard.

During playback of the recorded messages, if the user decides he may want to hear again the message presently being played, a user input is provided which, when actuated, causes the message number of the message being played to be stored in the processor memory. In this manner, the user can "cue" a particular message for later playback. Upon completion of the playback of the messages, the processor of the telephone answering device can read the number stored in memory and rewind the message tape to the corresponding message for playback.

The message numbers may be utilized in other ways as well. For example, after the telephone answering device is placed into an "answer" mode to respond to incoming calls, the device can store the message number of the first message received. Additionally, when the device is placed in the "playback" mode, the message number of the last message received can also be stored. When placed in the playback mode, the device can automatically rewind to the message corresponding to the initial message number and begin playback so that old messages preceeding the new messages need not be listened to. Furthermore, the device can automatically stop upon completion of the playback of the last message. In this manner, if the new messages are recorded on a previously used cassette, old messages found after the last new message also need not be listened to.

Other features utilizing the data stored on the data track include a "next message" function which allows the user to skip over unwanted messages. The processor monitors the data track while a message is being skipped and automatically resumes replay at the beginning of the next message, which is marked by the data track.

In an additional aspect of the present invention, a remote control unit is provided which transmits digital function codes for control of the telephone answering device. Each answering device function which can be controlled from the remote control unit is assigned a unique digital function code. A digital function code modulates an audio tone which is then transmitted by the remote control unit when a key on the remote control unit corresponding to that function is depressed by the user. The telephone answering device processor, upon receipt of the function code modulated audio tone, decodes the function code and initiates the function corresponding to that digital code. As will become more clear in the following detailed description, the telephone answering device requires only one tone decoder to demodulate the function codes transmitted from the remote control unit to digital signals recognizable by the telephone answering device processor.

In still another aspect of the present invention, a digital security code may be easily entered for the remote control unit to transmit to the telephone answering device before transmitting any of the function codes. Before the remote control unit is taken away to be used, the remote control unit is connected to the telephone answering device and the new code is entered into the telephone answering device by depressing switches on the face of the device. Upon receipt of the new code, the telephone answering device automatically enters the new security code via the connector to the remote control unit where it is stored in a remote control units memory. In this manner, the security code is automatically changed in both the telephone answering device and the remote control unit so that the user need not manually change the security code in first one and then the other. The remote control unit is then disconnected and is ready for use.

DESCRIPTION OF THE PREFERRED EMBODIMENT

Figure 1:
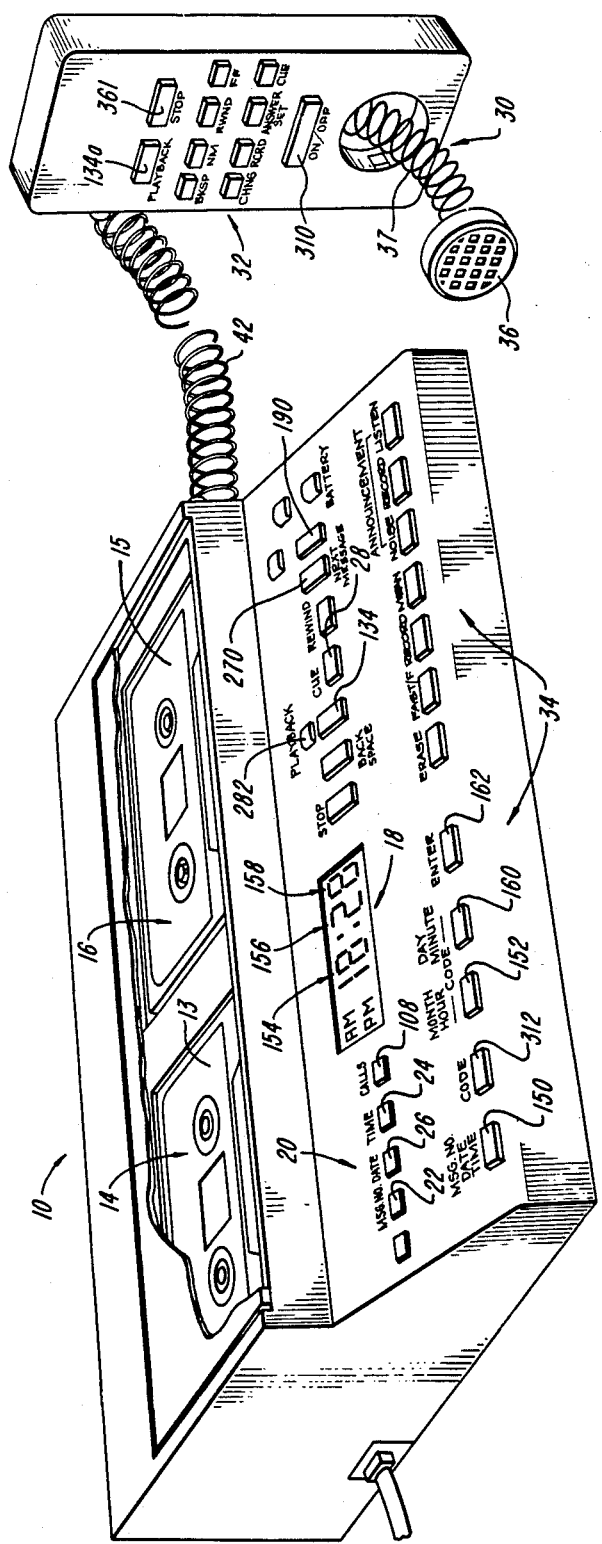
FIG. 1 is a pictorial view of a telephone answering device and remote control unit in accordance with a preferred of the present invention.

FIG. 1 shows a telephone answering device 10 which employs a preferred embodiment of the present invention. The device 10 is coupled to a telephone line 12 to receive telephone calls placed to the user of the device 10. When a call is received, a prerecorded outgoing announcement (OGA) is played back from a first cassette tape 13 by a tape recorder/playback apparatus 14 (hereinafter OGA tape drive 14). The announcement usually states that no one is available to answer the phone and that a message may be dictated by the caller at the sound of a tone at the end of the announcement. The message dictated by the caller, i.e. the incoming message (ICM), is recorded on a second cassette tape 15 by a second recorder/playback apparatus 16 (hereinafter ICM tape drive 16). The ICM cassette tape 15 has two tracks, a message track for recording the incoming message and a data track for recording digital information signals identifying the incoming message being recorded. In the illustrated embodiment, the message identification information includes a message number, the time that the message being recorded was received, as well as the date the message was received. This information is recorded continuously and repetitively on the data track while the incoming message is being recorded on the message track of the ICM tape 15.

The recording of the message identification information onto the ICM tape data track (as well as the message itself onto the message track) is performed under the control of a programmed microprocessor. The microprocessor, together with a program memory and data memory, forms a microcomputer which implements this novel function as well as the following inventive functions which will now be described.

To listen to the callers' messages, the ICM tape 15 is rewound and the messages recorded by the ICM tape drive 16 are played back. As the user is listening to the messages played back from the message track, the device 10 reads the digital message identification data recorded on the data track and continuously displays this information on a display 18 as the message is played back. For example, while the first message recorded by the ICM tape drive 16 is being played back, a "1" appears in the display 18. The device 10 also has a plurality of display mode indicators 20 which label the information being displayed in the display 18. Thus, while the message number "1" is being displayed in the display 18, an LED (light emitting diode) indicator 22 beneath the label "MSG. NO." of the display mode indicators 20 is lit. After the message number has been displayed for a certain duration (for example, 3 seconds), the time that the first message was received is indicated in the display 18 and a "TIME" LED indicator 24 is lit. Subsequently, the date that the first message was received in shown in the display 18 and the "DATE" LED indicator 26 is lit. In this manner, the message number, date and time are sequentially and continuously displayed while the message is being played back.

While the user is listening to the messages being played back, he may decide that the message presently being played back is sufficiently interesting to listen to again. The device 10 has a "CUE" key or switch 28, which when depressed by the user, causes the device 10 to store the message number of the message presently being played back in the cue memory for later replay of the message. In the illustrated embodiment, up to three such message numbers may be stored for later playback. Upon completion of the playback of the recorded messages, the user may replay the last message cued by again pressing the cue switch 28. The device 10 then automatically rewinds to the beginning of the message corresponding to the last message number stored in the cue memory, replays that message and stops. If the user has selected other messages for replay, the user may then depress the cue switch 28 again causing the device 10 to rewind the ICM tape 15 to the beginning of the next selected message for replay.

The telephone answering device 10 also has a remote control unit 30 which can operate the device 10 from a remote location. The remote control unit 30 is shown in FIG. 1 connected to the device 10 through a cable connector 42 which is only used when a new security is entered into both. During normal use, the device 10 and remote control unit 30 are not connected together which allows the remove control unit to be taken away.

The remote control unit 30 has a keypad 32 of a plurality of function keys or switches to control the answering device 10. Each key controls a separate answering device function such as "stop", "rewind", "fast forward", "cue", etc. The keys of key pad 32 duplicate similar function switches 34 located on the telephone answering device 10.

To operate the telephone answering device 10 from another location, the user places a telephone call to his own number which the device 10 answers. A speaker 36 is detached from the remote control unit 30 and is placed adjacent the mouthpiece of the telephone handset. The speaker 36 remains electrically connected to the remote control unit 30 by a flexible cord 37 which allows the remote unit 30 to be conveniently held while the speaker 36 is placed near the telephone mouthpiece. When the remote control unit 30 is first turned on, the unit transmits a digital security code (such as that represented by the waveform shown in FIG. 7A) to the answering device 10 over the telephone line 12. In the illustrated embodiment, this security code may represent any number between 0 and 1999. If the answering device recognizes the security code transmitted by the remote control unit 30 as the correct security code, the answering device 10 then enables itself to receive the function codes transmitted by the remote control unit 30, decode them, and implement them. The answering device 10 will ignore any remote control unit which does not transmit the correct security code.

Accordingly, after the remote control unit 30 is turned on (and the correct security code has been transmitted), the device 10 may be controlled by depressing any of the function keys of the keypad 32. Upon actuation of a key, a digital code which corresponds to the desired function is transmitted over the telephone line 12 to the answering device 10. An example of one such digital function code is represented by the digital waveform shown in FIG. 7B. In the illustrated embodiment, the function codes are transmitted over the telephone line 12 by a frequency shift key technique.

Figure 7A:
FIG. 7A illustrates an example of a digital security code waveform.
Figure 7B:
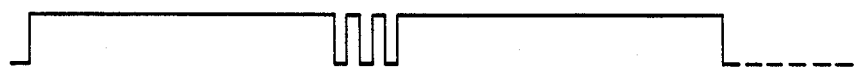
FIG. 7B illustrates an example of a waveform representing a digital function code.

The answering device 10 has an amplifier and filter circuit 38 and tone decoder 40 (FIG. 2) which demodulate the function code transmitted from the remote control unit 30 back to an unmodulated signal as represented in FIG. 7B. The microcomputer 44 of the telephone answering device 10 decodes the digital function code by recognizing which function is associated with that function code, and performs the associated function. The above described digital function codes are highly adaptable to control a large number of functions without requiring a correspondingly large number of frequencies or tones for transmitting the various function codes. In the illustrated embodiment only two frequencies are used for transmission and only one tone decoder is used for demodulation.

As previously mentioned, in order to initially set the security code or change the security code, the device 10 and remote unit 30 are connected together by the cable 42 before the remote control unit is taken away for use. The security code is easily entered into the device 10 by operating certain switches 34 on the face of the device 10. When the new security code is entered, the answering device 10 stores the security code in memory. The answering device 10 also automatically transmits the security code over the cable 42 to the remote control unit 30 where it is also stored. In this manner, the new security code is automatically entered into both the answering device 10 and the remote control unit. The user may then disconnect the cable 42 from the remote control unit and the answering device 10.

Figure 2:
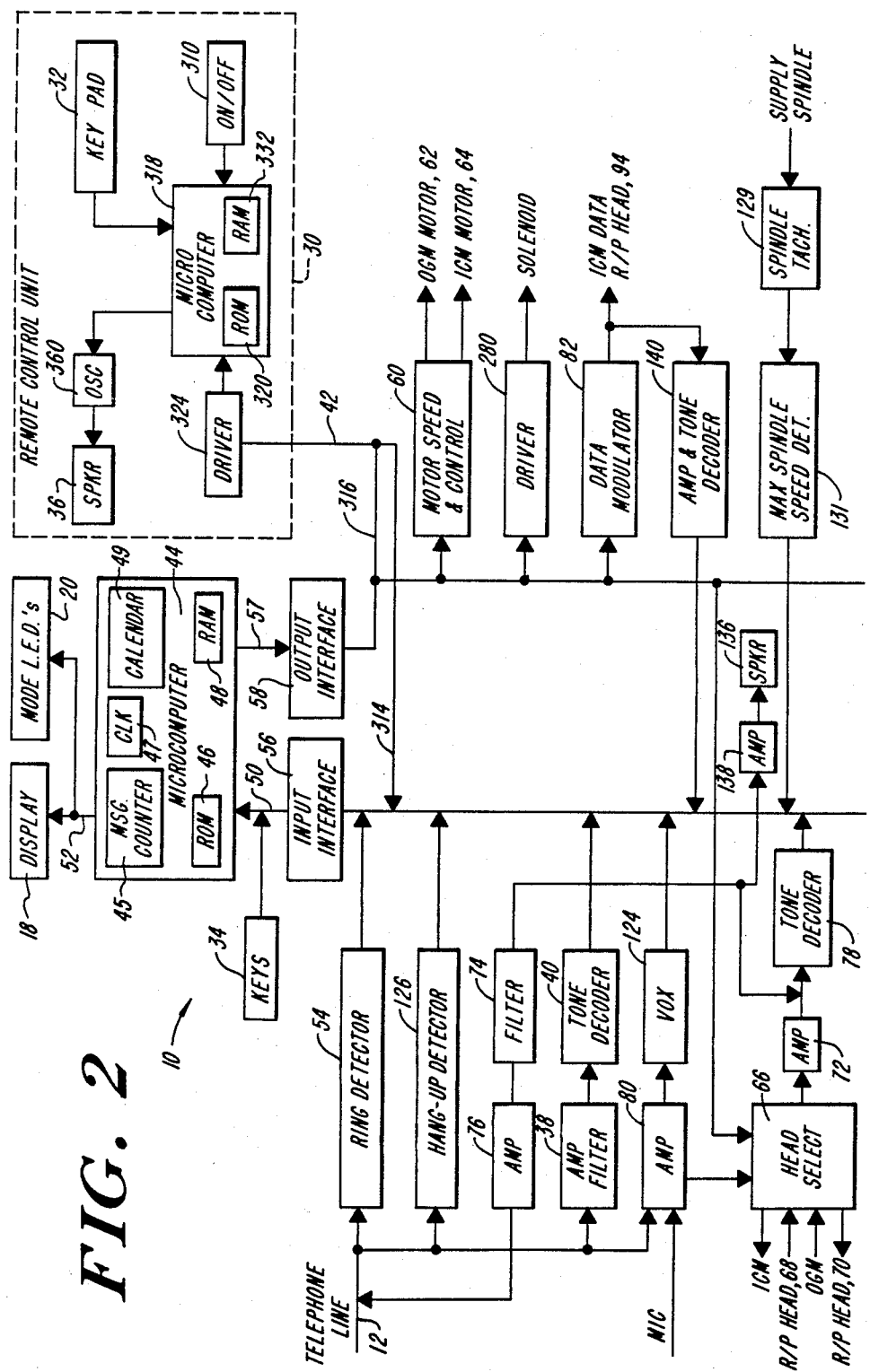
FIG. 2 is a schematic block diagram of the telephone answering device and remote control unit of FIG. 1.

Referring now to FIG. 2, a schematic block diagram of the telephone answering device 10 is shown. The answering device 10 includes a microcomputer 44 which has a microprocessor (not shown), a program read-only-memory (ROM) 46 and a random-access-memory (RAM) 48. The microcomputer 44 stores the security code entered by the user in the RAM 48. In addition, the message numbers cued during playback are also stored in the RAM 48. The microcomputer 44 further has an input bus 50 through which it reads the function switches or keys 34 of the answering device 10. The microcomputer 44 detects whether any of the keys 34 have been depressed and carries out the indicated function.

During playback of the messages recorded on the ICM tape 15, the microcomputer 44 outputs the message number, date and time information on an output bus 52 to be displayed by the display 18. At the same time, the microcomputer 44 lights the appropriate mode LED 20 to correspond with the information being displayed in the display 18.

The answering device 10 has a ring detector 54 connected to the telephone line 12 to alert the microcomputer 44 to respond to a ring signal. The ring detector 54 has an output connected to an input interface 56 which is connected to the microcomputer input bus 50. Ring detector circuits are well-known in the art and the input expander 56 may be an input multiplexer, for example.

The microcomputer 44 has an output bus 57 connected to an output interface 58 which may be an output multiplexer, for example. The microcomputer 44 controls the OGA tape drive 14 and ICM tape drive 16 through the output interface 58. Accordingly, the output interface 58 is connected to a motor speed and motor control circuit 60 which controls the OGA motor 62 and ICM motor 64 of the OGA tape drive 14 and ICM tape drive 16, respectively. The motor speed and control circuit 60, under the control of the microcomputer 44, turns the motors on and off, controls the speed (i.e. fast forward or normal) and the direction (i.e. forward or reverse). Such motor speed and control circuits are also well-known in the art. A head select circuit 66 activates either the ICM message track record/playback head 68 or alternatively the OGA record/playback head 70 under the control of the microcomputer 44.

When an incoming call is detected by the ring detector 54, the microcomputer 44 seizes the line (i.e., puts the device "off-hook") and initiates proper commands to begin the answering cycle. The microcomputer 44 then starts the OGA motor 62 to playback the prerecorded announcement recorded on the OGA tape 13. Accordingly, the microcomputer 44 selects the OGA record/playback head 70 and places it in the playback mode. The output of the OGA head 70 is connected to an amplifier 72 which is in turn connected to a filter 74 and a second amplifier 76. The announcement recorded on the OGA tape 13 is amplified by the amplifers 72 and 74 and transmitted to the caller on the telephone line 12.

In the illustrated embodiment, the OGA tape 13 is a continuous "endless loop" tape. When the user initially records the announcement on the OGA tape 13, the device 10 records an 800 Hz tone on the remaining OGA tape when the announcement is completed to mark the end of the announcement. When a call is received, the 800 hertz tone indicates to the caller that the answering device 10 is ready to record his message. This 800 hertz tone is detected by a tone decoder 78 connected to the output of the amplifier 72. Upon receipt of a signal from the tone decoder 78 indicating that the end of the announcement has been encountered, the microcomputer 44 starts the ICM motor 64 of the ICM tape drive 16 and turns off the OGA motor 62 (after the OGA tape 13 returns to the start of the tape). In addition, the ICM record/playback head 68 is selected to record the caller's message on the ICM tape 15 of the ICM tape drive 16. The caller's message from the telephone line 12 is amplified by an amplifier 80 and is transmitted to the ICM record/playback head 68 for recording on the message track of the ICM tape.

As previously mentioned, as the caller's message is being recorded on the ICM message track, digital message identification signals are simultaneously recorded on the data track. In the illustrated embodiment, these digital signals represent the message number, time received and date received of the message being recorded. The microcomputer 44 counts each incoming message with a message counter 45 and assigns a unique message number to that message. For example, the third incoming message may be designated "message number 3". The message number of the message presently being recorded by the ICM tape drive 16 is stored in the RAM 48 for recording on the message track.

The microcomputer 44 further has a time clock 47 which is read at the start of the incoming message. The time that the message started is then temporarily stored in the RAM 48 while the message is being recorded. The microcomputer 44 further has a calendar 49 which is also read at the beginning of each incoming message. Thus, the date of the message is also temporarily stored in the RAM 48 together with the message number and the time that the message was received. In the illustrated embodiment, the message counter, clock and calendar functions are internally implemented by the microcomputer together with the program stored in the ROM 40. Alternatively, a dedicated clock circuit, message counter and date computing circuit may be utilized to implement these functions.

While the incoming message is being recorded on the message track of the ICM recorder 16, the microcomputer 44 continuously amd repetitively transmits the message identifcation information, stored in the RAM 48, in digital form to a data modulator 82 for recording on the data track of the ICM tape 15 via the message track recording head 94. The data modulator 82 transforms the digital message identification signals from the microcomputer 44 to a form suitable for recording on the data track of the ICM tape 15.

Figure 3:
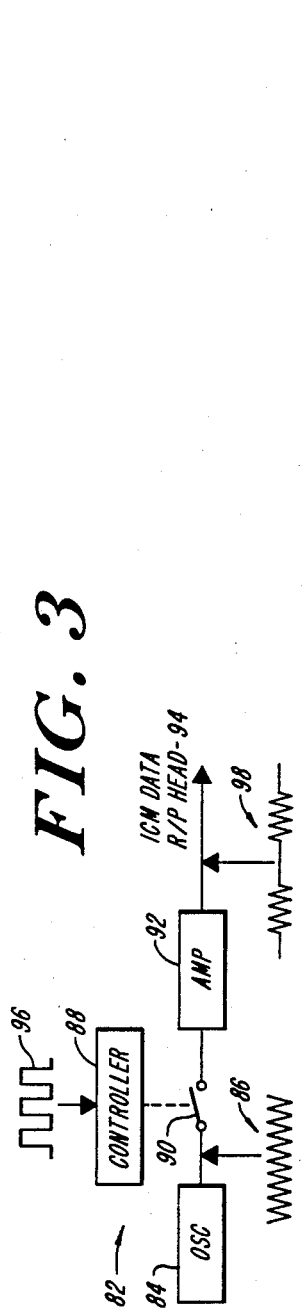
FIG. 3 is a schematic diagram of a data modulator for the telephone answering device of FIG. 1.

The data modulator 82 is schematically shown in greater detail in FIG. 3. The modulator 82 includes an oscillator 84 which produces a continuous audio tone represented by the waveform 86. The digital message identification signals from the microcomputer 44 are presented to the input of a controller 88 which controls an analog switch 90. The switch 90 is connected to the output of the oscillator 84 and is closed by the controller 88 in response to a logical 1 from the computer. Conversely, the controller 88 opens the switch 90 in response to a logical 0, in the illustrated embodiment.

The output of the switch 90 is connected to an amplifier 92, the output of which is connected to the ICM data record/playback head 94. To illustrate the operation of the data modulation 82, FIG. 3 shows a portion of a digital message identification waveform 96 which has two logical 1's, or pulses presented at the input of the controller 88. The two digital pulses cause the analog switch 90 to close and open twice modulating the audio tone to produce two audio modulated pulses or bursts as represented by the waveform 98 at the output of the amplifier 92. The modulated digital message identification signals at the output of the amplifier 92 are outputted to the ICM data record/playback head 94 for recording on the message track of the ICM tape 15.

Figure 4:
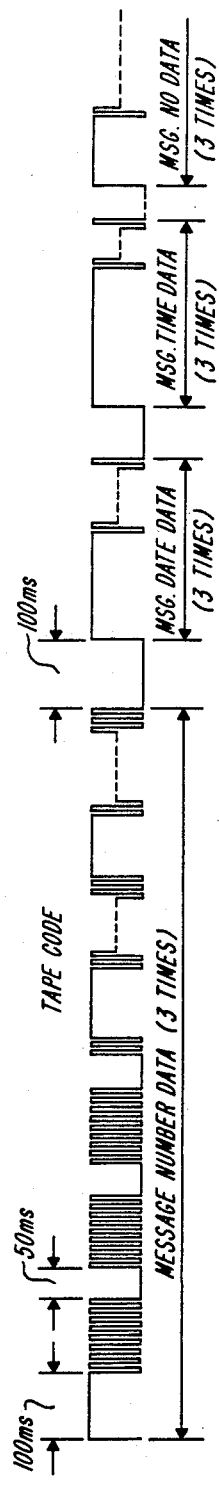
FIG. 4 is a waveform representation of an example of the digital information to be stored on the data track of the telephone answering device of FIG. 1.

FIG. 4 shows an example of one format in which the digital message identification data may be transmitted from the microcomputer 44 and recorded on the message track. The message data of the illustrated embodiment is shown as a series of groups of pulses separated by 50 millisecond spaces. Each pulse within a group is separated by a 10 millisecond space. The first message identification data is the message number which has four digits. In the example of FIG. 4, there are four groups of pulses (representing the four digits) preceeded by a 100 millisecond pulse. In the coding scheme of the illustrated embodiment, ten pulses represent a decimal 0 and the remaining decimal digits, 1–9, are represented by a corresponding number of pulses. Thus, the initial three groups of ten pulses followed by the group of two pulses of the waveform of FIG. 4 represent message number "0002". It is recognized of course that other digital coding schemes may be used such as binary-coded-decimal (BCD), for example.

The message number is repeated two more times and is followed by a 100 millisecond space. After an initial 150 millisecond pulse, there are four more groups of pulses (representing four decimal digits) which indicate the date that the message was received. The first two groups of pulses designate the month that the message was received and the last two represent the day of the month. The message date data is also repeated two times. After an initial 300 millisecond pulse there are four groups of pulses which indicate the time that the message was recorded. The time data is also repeated two times.

Figure 8:
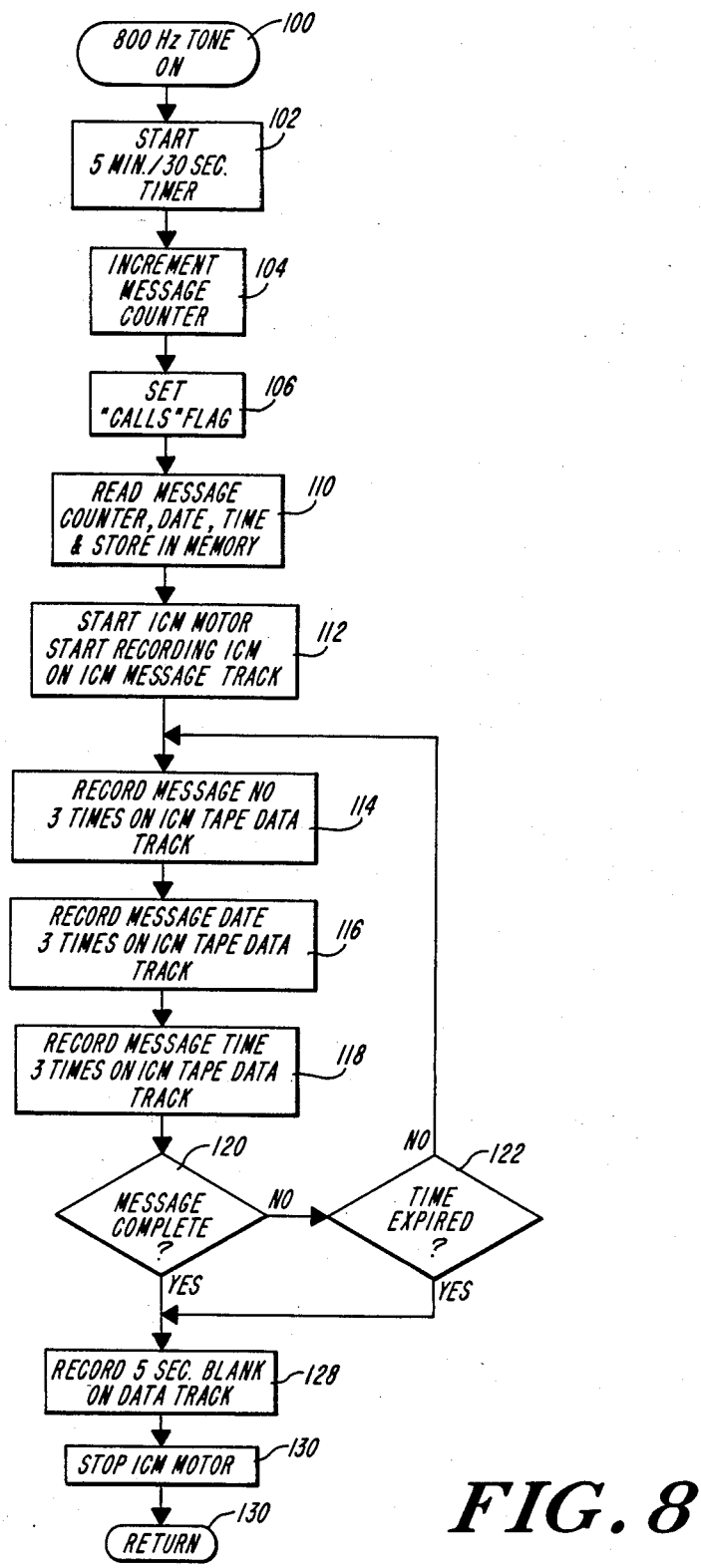
FIG. 8 is a flow chart describing the operation of the processor of the telephone answering device of FIG. 1 to accomplish the function of recording the incoming messages (ICM)

A flow chart representing the microcomputer program for recording the incoming messages is shown in FIG. 8. This program (or subprogram) is initiated by the 800 hertz tone recorded at the end of the announcement on the OGA tape. The 800 hertz tone is detected by the tone decoder 78 (FIG. 2) which initiates execution of the program of FIG. 8 and thus the recording of the incoming message, as indicated in block 100 of FIG. 8. Upon detection of the 800 hertz tone, the microcomputer 44 starts a timer (102) to set a maximum duration for the message to be recorded by the caller. The user has the option of setting a five minute or 30 second limit in the illustrated embodiment. Since a new message is being recorded, the message counter of the microcomputer 44 is incremented (104) so that the counter indicates the new message number. Next, a "CALLS" flag is set (106) and a "CALLS" LED 108 is illuminated (FIG. 1) to indicate to the user that at least one message has been received and recorded.

The microcomputer 44 reads (110) the message counter 45 to determine the message number of the incoming message and also reads the calendar 49 and clock 47 to determine the date and time of the incoming message. This message identification information is stored in digital form in the microcomputer RAM 48 in preparation for transmission to the ICM tape drive 16 (FIG. 1) to be recorded on the message track. Recording of the incoming message is begun by starting (112) the ICM motor 42 and selecting the ICM record/playback message head 68. As the caller dictates and telephone answering device records his message onto the message track of the ICM tape 15, the microcomputer 44 transmits (114) the digital signals representing the message number to the data modulator 82 for recording on the data track of the ICM recorder 16. The message number is transmitted three times for error checking purposes as will be more fully explained below. After the message number data, the message date data (116) and the message time data (118) are each transmitted three times to the data track as shown in the example of FIG. 4.

If the caller has not finished dictating the message (120) the timer is examined (122) to determine if the alloted time for the message has expired. Referring to FIG. 2, the answering device 10 has a VOX detector circuit 124 connected to the amplifier 80. The VOX detector circuit 124 monitors the incoming message and produces an output to the microcomputer 44 when the voice signal is absent. If the voice signal is absent for a certain minimum time (for example, three seconds) the microcomputer 44 will assume that the caller is finished and that the message is complete. The answering device 10 optionally also has a hang-up detector 126 which provides an output to the microcomputer 44 as to when the caller hangs up. This provides an additional indication to the microcomputer 44 when the incoming message has been completed. If the message has not been completed and the time has not expired, the microcomputer again transmits the message identification signals (114, 116, 118) to the ICM tape drive 16 for recording on the data track. In this manner, the message identification signals are continuously recorded on the data track while the incoming message is recorded on the message track of the ICM tape 15.

Figure 5:
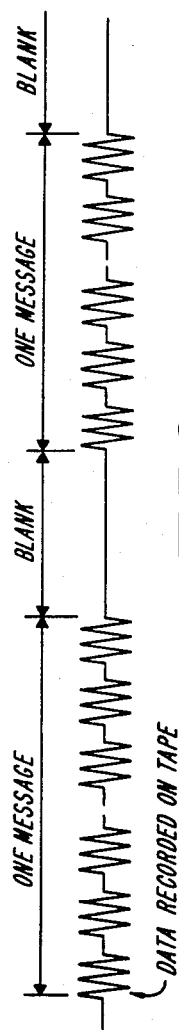
FIG. 5 is a waveform representation of the modulated digital information of several messages stored on the data track.

When the microcomputer 44 determines that the incoming message has been completed, the microcomputer 44 stops sending the message data and a five second blank is recorded (128) on the data track at the end of the digital message identification signals. FIG. 5 is a waveform representation of the modulated digital message signals for several messages on the data track. In the illustrated embodiment, throughout each message there are no blanks or spaces between individual pulses or bursts on the data track, which are greater than 100 milliseconds in duration. Thus, the five second blank on the data track at the end of the message identification data unambiguously identifies the end of an incoming message on the message track (and hence the beginning of the next incoming message to be recorded on the message track).

As the incoming message is recorded, the ICM tape 15 is unwound from the supply side of the cassette and is wound on the take-up side of the cassette. The supply side spindle or shaft from which the tape 15 is unwound, will rotate faster as the tape is used up. The device 10 has a spindle tachometer 129 (FIG. 2) which is coupled to the supply spindle and monitors the rotational speed of the supply spindle.

The speed of the supply spindle corresponds to the amount of ICM tape left on the supply spindle. A maximum spindle speed detector 131 is connected to the output of the tachometer 129 and provides an output to the microcomputer 44 when the speed of the supply spindle exceeds a predetermined threshold. In the illustrated embodiment, this threshold corresponds to an amount of tape left on the supply side spindle which equals the maximum tape necessary to record an incoming message. Thus, when the detector 131 signals the microcomputer 44 that the amount of ICM tape 15 left is less than or equal to one message length, the microcomputer 44 will not record any additional message after the one presently being recorded. The device 10 has a separate "announcement only" message recorded on the second track of the OGA tape 13 which does not instruct the caller to leave a message. Thus, the announcement only message is played when a call is received instead of the regular announcement, when the ICM tape 15 is almost used up.

Referring back to FIG. 8, upon completion of the recording of the five second blank, the incoming message motor 64 is stopped (130) and the microcomputer 44 returns (132) to other tasks i.e., a monitor routine which places the microcomputer 44 in readiness to detect the next call. The above-described process is repeated for each incoming message. Each incoming message is recorded on the message track of the ICM tape 15, while simultaneously, the message number and date and time the message was received are continuously recorded on the data track of the ICM tape 15. Upon completion of the message, a five second blank is recorded on the data track to mark the end of that message and also the beginning of the next message, if any.

When the user desires to listen to the recorded incoming messages, he first checks to see if the "CALLS" LED 108 (FIG. 1) is lit. If not, then the user has not received any calls. If the calls LED 108 indicates that messages have been received, the user may depress a "PLAYBACK" switch or key 134 on the front of the answering device 10 to replay the recorded messages. As an additional feature of the illustrated embodiment, the microcomputer 44, upon closure of the playback key 134, automatically controls the ICM tape drive 16 to rewind the ICM tape 15 to the beginning of the first message received. To determine the location of the beginning of the first message, the microcomputer 44 utilizes the message numbers assigned to the incoming messages, as will be more fully explained below.

Referring now to FIG. 2, when the ICM tape 15 is positioned at the beginning of the first message, the ICM record/playback message head 68 is selected and the ICM tape drive 16 is placed into the playback mode. The incoming messages recorded on the message track are played back through a speaker 136 connected to the output of an amplifier 138. The amplifier 138 is in turn connected to the output of the amplifier 72 of the ICM record/playback head 68. While a message is being played back through the speaker 136, the message identification signals recorded on the data track of the ICM tape 15 for that particular message are simultaneously played back through the ICM data record/playback head 94. These message identification signals are amplified and demodulated by an amplifier and tone decoder 140. The tone decoder 140 reconverts the modulated digital message identification signals represented in FIG. 5 back to the unmodulated square waveform shown in FIG. 4. The demodulated message identification signals from the message track are inputted by the microcomputer 44 which sequentially displays the message number and date and time the message was received on the display 18 while that message is being played back through the speaker 136.

In addition to displaying the message number of the message being played, the microcomputer 44 also compares this message number with the message number of the last message recorded. When this last message number is encountered, indicating that the last message is being played back, the answering device 10 automatically stops playback at the end of the message.

As an additional advantage of the illustrated embodiment, if the user, upon completion of the normal playback, desires to listen to a particular message again, the facility is provided for entering the message number of the desired message into the answering device 10. When the playback key is depressed, the device 10 will automatically rewind the ICM tape to the beginning of that message and begin playback. This is another message selection feature in addition to the cue function already described. If no message number is selected prior to depressing the playback key, the device 10 automatically rewinds to the beginning of the first message and begins playback.

To enter the number of the desired message, a mode key 150 on the front of the answering device 10 is repeatedly depressed until the MSG NO.(message number) LED 22 is lit indicating that the device is in the message number mode. The first digit of the message number may then be entered by depressing a switch 152 and then releasing the switch when the desired digit appears in the position 154 of the display 18. The display 18 automatically displays the digits 0-9 rapidly in sequence until the switch 152 is released, freezing a particular digit in position 154. The last two digits of the message number may be similarly entered by depressing a key 160 and releasing when the desired digits appear in the two right digit positions 156 and 158 of the display 18. With the message number of the desired message indicated in the display 18, the "ENTER" key 162 may be depressed which causes the answering device 10 to temporarily store the selected message number in the RAM 48. When the playback key 134 is depressed, the device 10 automatically rewinds the ICM tape to the beginning of the message corresponding to the entered message number to play back the selected message.

Figure 9A:
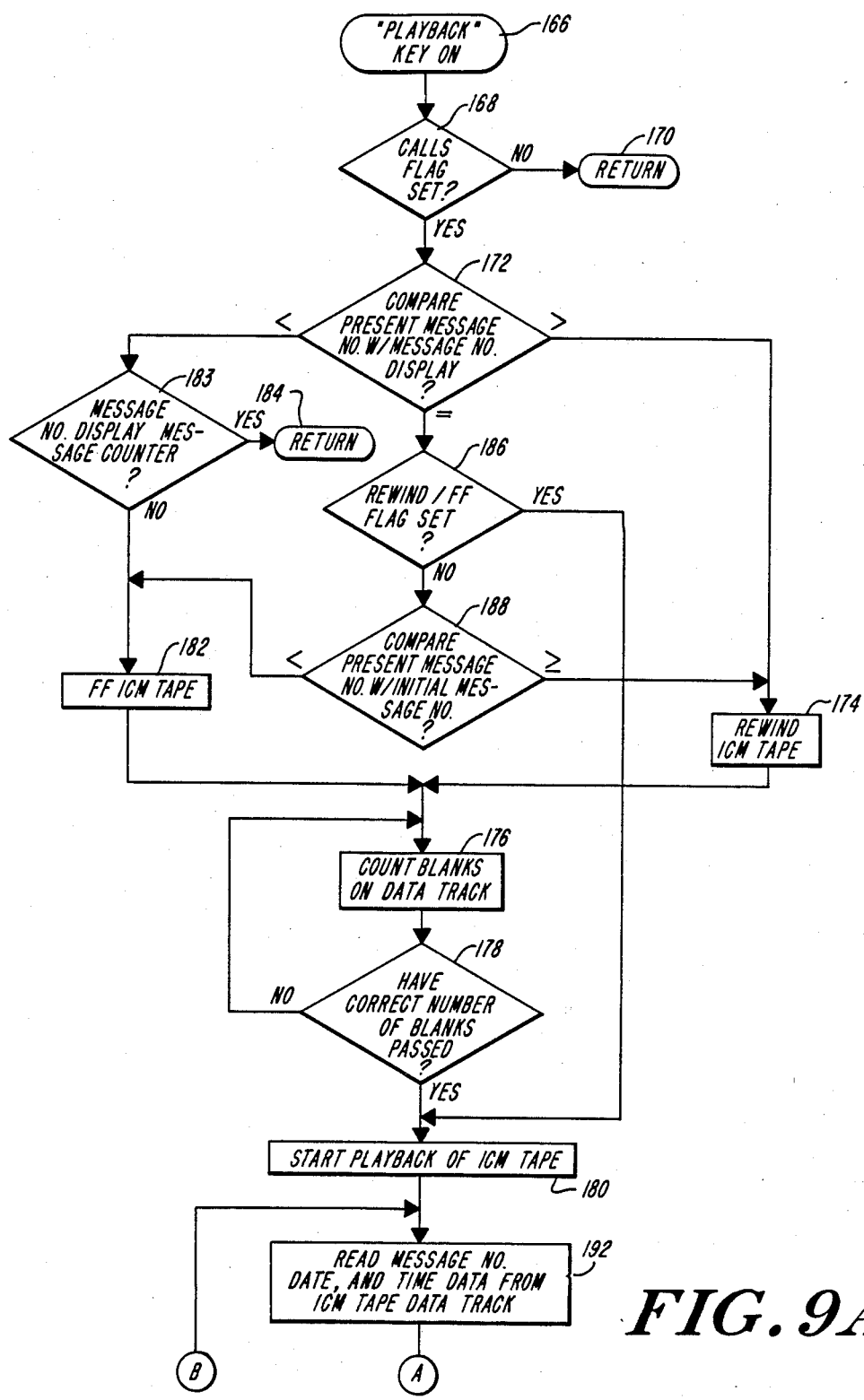
FIGS. 9A-9B are a flow chart describing the playback of incoming messages by the telephone answering device of FIG. 1.
Figure 9B:
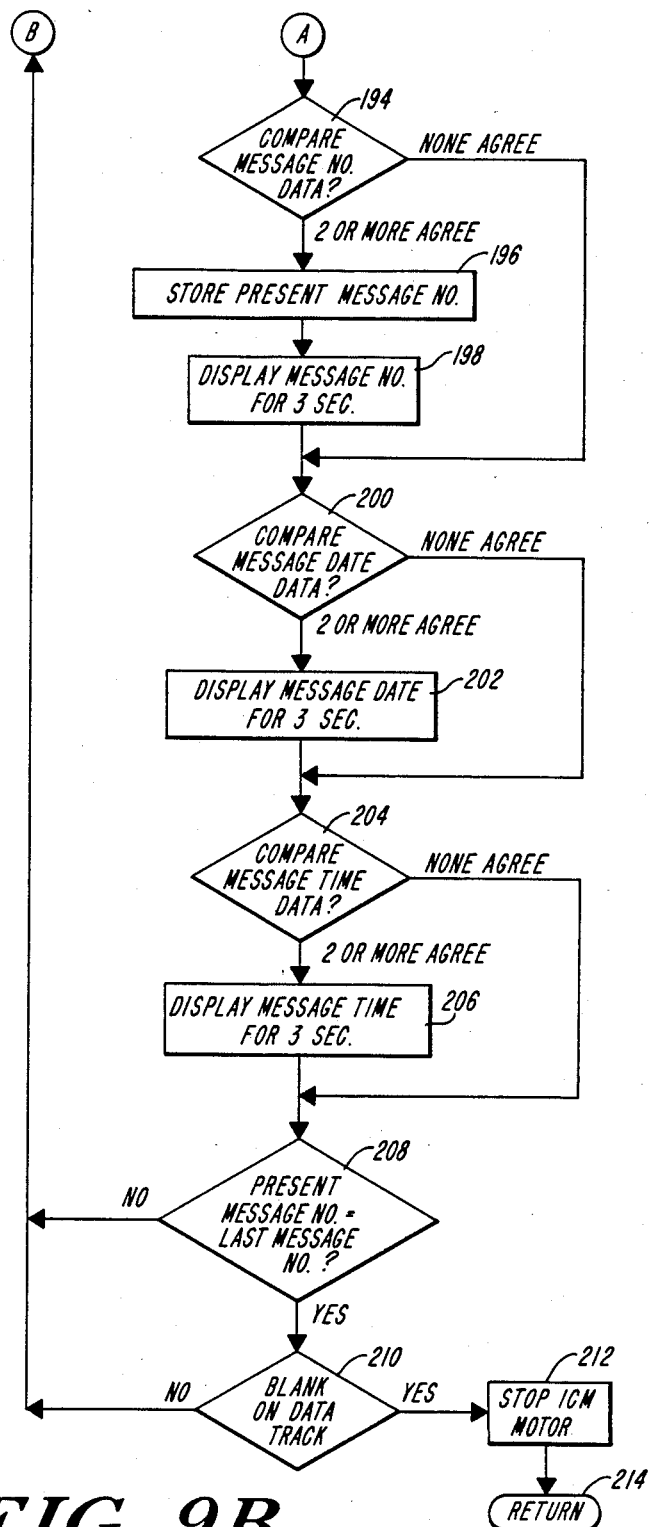

These playback features are described in greater detail in FIGS. 9A-B which show a flow chart of the microcomputer operation during playback. The program is initiated when the microcomputer 44 senses that the playback key 134 has been depressed (166). If no calls have been received (168) by the answering device 10, the microcomputer 44 returns (170) to other tasks. If calls have been received, then the "present" message number is compared (172) with the message number shown in the display 18. The "present" message number is the message number of the last message replayed. If the "present" message number differs from the message number shown in the display, this indicates to the microcomputer 44 that the user has entered a new message number for replay. If the present message number is greater than the message number shown in the display, the ICM tape 15 is rewound (174). As the ICM tape is rewound, the five second blanks on the data track between messages are counted (176) until the correct number of blanks has been passed (178) to bring the ICM tape to the beginning of the message corresponding to the entered message number. For example, if the message number of the last message played, that is, the present message number, is 7 and message number 5 has been entered into the display 18, then the third five second blank encountered as the ICM tape is rewound will be the beginning of message number 5. At that time, the ICM tape is stopped and the playback of message number 5 is begun (180). The microcomputer 44 monitors the 5 second blanks on the data track through the tone decoder 140 of FIG. 2.

Alternatively, if the present message number is less (172) than the message number entered in the display 18 then the incoming message tape is fast forwarded (182) if the entered message number is less than or equal (183) to the message counter. As previously mentioned, the message counter indicates the message number of the last incoming message recorded. Thus, if the entered message number is greater than the message counter, the user is attempting to play back a message corresponding to a message number not yet recorded. In which case, the microcomputer 44 returns (184) to other tasks.

If the user has not selected a particular message number for replay (i.e., normal replay) and the user has not previously rewound or fast forwarded the ICM tape (186) before pressing the playback switch 164, the present message number is compared with the "initial" message number (188). The "initial" message number is the message number of the first message recorded after the "ANSWER SET" key 190 (FIG. 1) is pressed. The answer set key enables the answering device 10 to begin answering calls. If the present message number is greater or equal to the initial message number, the ICM tape is rewound (174) to the beginning of the message corresponding to the initial message number (176 and 178). In this manner, upon depressing the playback key 164 (if the user has not entered a particular message number for replay), the ICM tape is automatically rewound to the beginning of the initial message of the set of messages recorded since the answer set key was activated.

As an example of an "initial" message, if two message are initially recorded, they will be assigned message numbers 1 and 2, respectively. These messages may be played back, and after playback of message number 2, the last message, the answering device will automatically stop. The answer set key 190 can then be depressed which enables the answering device to receive more calls. The next message received will be assigned message number 3 and 3 is the new "initial" message number. Thus, after additional calls are received and recorded, upon depressing the playback key 134, the answering device 10 will automatically rewind to the beginning of message number 3.

After the ICM tape 15 is rewound (or fast forwarded) to the beginning of the desired message, playback is begun (180). As the message on the message track is replayed through the speaker 136 (FIG. 2), the microcomputer 44 reads the message number, date and time data (192) from the ICM tape data track. As previously noted, the message number data is recorded three times in a row. The three message numbers are compared (194) and if two or more agree then the consensus message number is stored (196) in RAM 48 as the "present" message number. In addition, the message number is displayed by the display 18 for three seconds (198) with the MSG. No. LED 22 (FIG. 1) also illuminated to indicate that the number in the display 18 is the message number of the message being played. In a similar manner, the three message dates are compared (200) and if two or more agree, the date is displayed (202) in the display 18. In addition, the date LED 26 is lit indicating that the number shown in the display 18 is the date that the message being played was received. The message time data is treated in a similar manner (204 and 206).

If the message number of the message presently being played is the number of the last message recorded (208) as indicated by the message counter of the microcomputer 44, then the ICM tape 15 has reached the last message recorded. Otherwise the microcomputer continues to read the message data (192) and display it. At the end of the last message (210) the ICM motor 64 is stopped (212) and the microcomputer 44 returns (214).

In addition to the user entering the message number of a particular message for replay, the telephone answering device 10 of the present invention has a cue memory by which the user may select particular messages for later replay. As previously mentioned, as each message is being replayed, the message number for that particular message is displayed by the display 18. If the cue key 28 (FIG. 1) is depressed during the replay of a message, the message number is stored in a cue memory which is a portion of the RAM 48 (FIG. 2). As other messages are played back, the user may select additional messages for replay by depressing the cue key 28 while the selected message is being played back.

Figure 10:
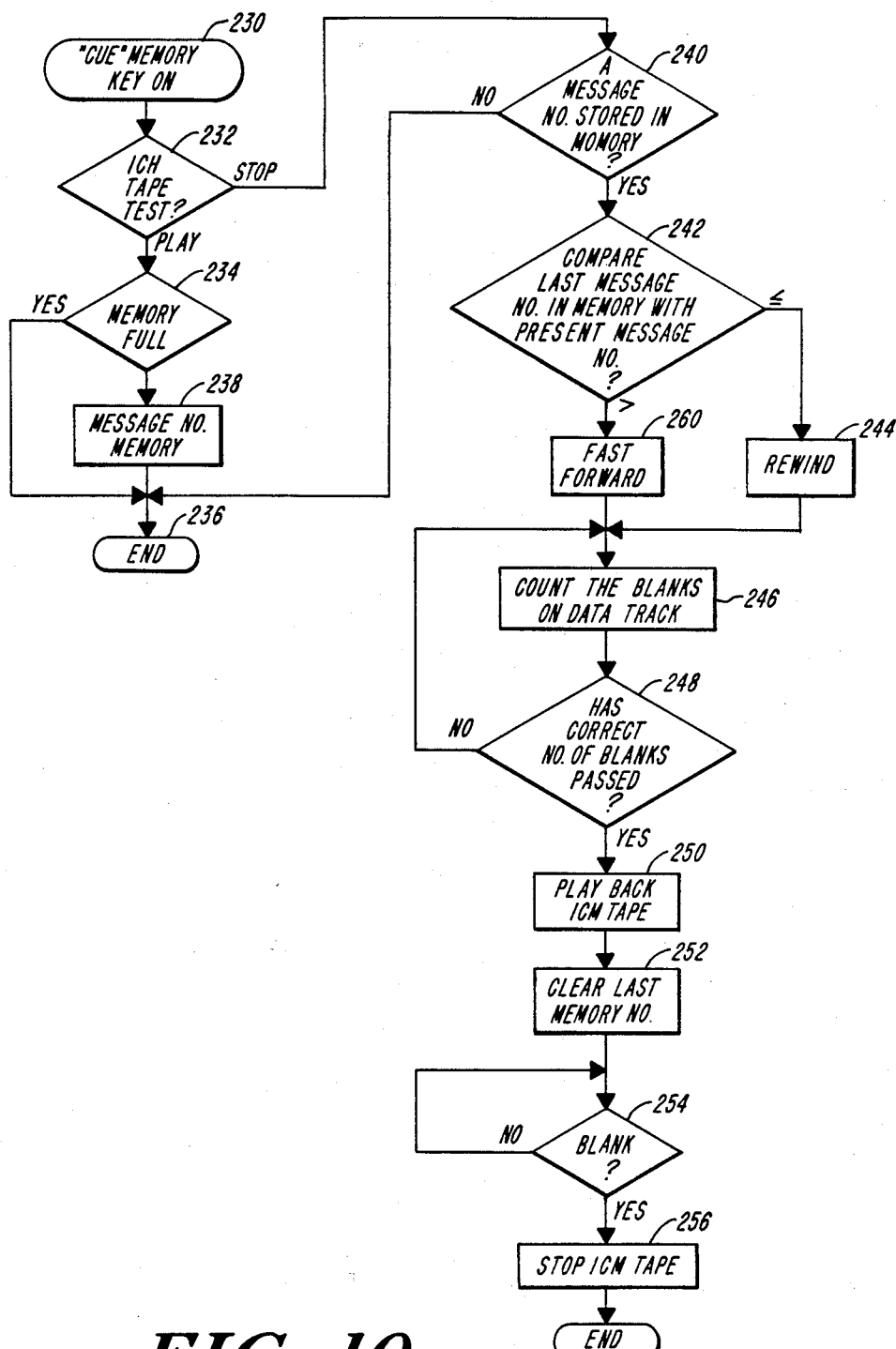
FIG. 10 is a flow chart describing the cue memory function of the telephone answering device of FIG. 1.

After the user has completed playing back all the messages, the user can replay the last message cued by again depressing the cue key 28. The answering device 10 will automatically rewind the ICM tape 15 to the beginning of the last message cued and replay that message. The ICM tape drive 16 will then automatically stop at the end of the message. If the user again depresses the cue key 28, the next to last cued message will then be replayed. In the illustrated embodiment, up to three such messages may be cued and later replayed. The cue memory feature is described in greater detail in the microcomputer program flowchart of FIG. 10.

When the microcomputer 44 senses that the cue key 28 has been depressed (230), the microcomputer 44 determines whether the ICM tape drive 16 is stopped or is playing back messages (232). If the ICM tape drive 16 is stopped or is playing back messages (232). If the ICM tape drive 16 is in the proceaying back a message, then the user has depressed the cue key 28 to select that message for later playback In which case, the microcomputer 44 determines if the cue memory of the RAM 48 is full (234). In the illustrated embodiment the cue memory can hold up to three message numbers. If the cue memory is full, the microcomputer 44 ignores (236) the cue key 28 while the ICM tape drive 16 is in playback. If the cue memory is not full, the microcomputer 44 stores (238) the message number of the message being played into the cue memory of the RAM 48.

If the ICM tape drive 16 is stopped (232) when the cue key 28 is depressed, the microcomputer 44 determines if any message numbers have been stored (240) in the cue memory. In the illustrated embodiment, the last message number stored in the cue memory is the first message which is replayed. The microcomputer 44 compares (242) the last message number stored in the cue memory with the present message number (which is the message number of the last message played). In other words, the microcomputer 44 compares the message number of the message to be replayed with the present location of the ICM tape 15 of the ICM tape drive 16. If the cued message is located preceding the present location of the ICM tape, the ICM tape is rewound (244) and the blanks on the data track marking the end or beginning of each message on the message track are counted (246) until the beginning of the cued message is located (248). For example, if the cued message has message number 27, and the message number of the last message replayed is message number 31, then after five blanks are counted, the playback head 68 of the ICM tape drive 16 will be positioned at the beginning of the cued message (number 27). When the fifth blank is encountered, playback is initated (250) and the last message number in the cue memory (27 in this example) is cleared (252).

The playback of the cued message is complete when a blank is encountered on the data track (254) marking the end of the message on the message track and the ICM tape is stopped (256). The cue memory program ends (258) and the microcomputer 44 halts or returns to other tasks. If the cue key 28 is again depressed (230) the next message number stored in the cue memory is examined (242) and the ICM tape 15 is rewound (244) to the beginning of the cued message. If the message number of the preceeding cued message exceeds the present message number (242), the ICM tape is fast forwarded (260) to the beginning of the cued message.

Figure 11:
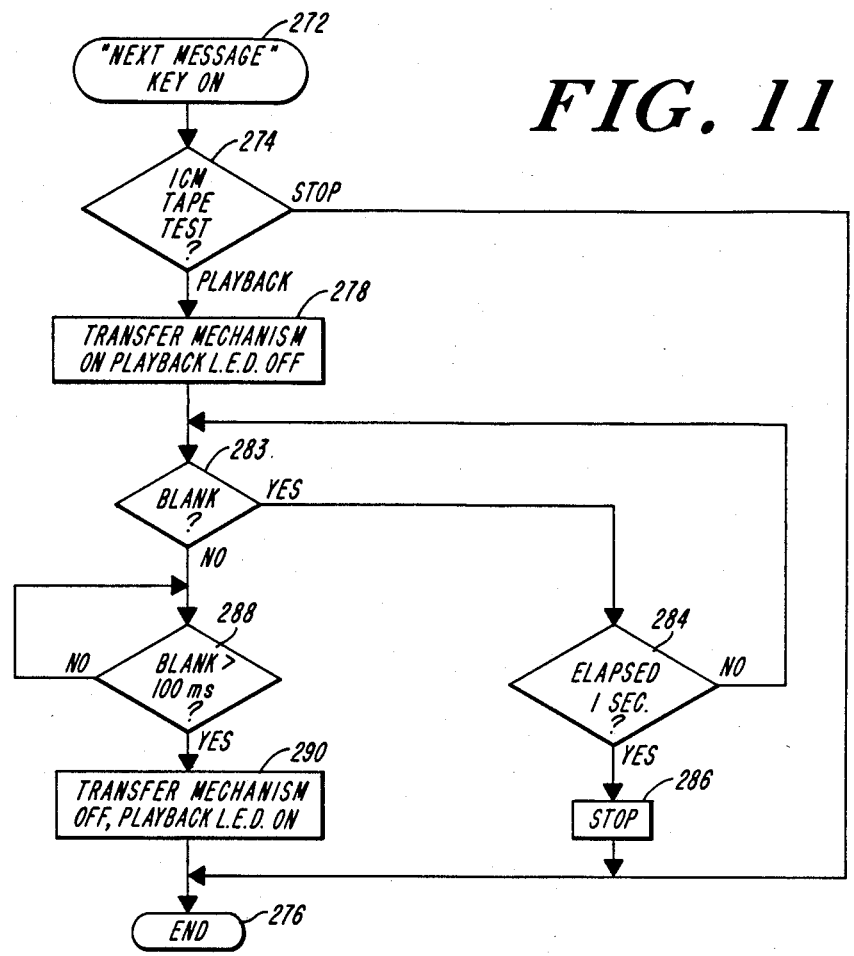
FIG. 11 is a flow chart describing the "next message" function of the telephone answering device of FIG. 1.

Another feature of the illustrated answering device 10 allows the user to skip over unwanted portions of messages during playback of the messages. The answering device 10 has a "NEXT MESSAGE" key 270 (FIG. 1), which causes the ICM tape drive 16 to switch from playback mode to fast forward and fast forward the ICM tape to the beginning of the next message. FIG. 11 illustrates the manner in which the microcomputer 44 implements this function. When the microcomputer senses that the next message key 270 has been depressed (272), the microcomputer 44 determines whether the ICM tape drive 16 is in the playback or stop mode. If the ICM tape drive 16 is stopped, the microcomputer 44 ignores (276) the next message key 270. If the ICM tape drive 16 is in playback mode, the ICM forward-rewind drive transfer mechanism is actuated (278) and the ICM tape drive 16 is switched from playback to fast forward mode. (The transfer mechanism or plunger is actuated by a solenoid which is energized by a driver 280 (FIG. 2) controlled by the microcomputer 44 through the output interface 58.) At this time, a "PLAYBACK" LED 282 (FIG. 1) is extinguished, indicating that the answering device 10 is no longer in playback mode.

The microcomputer 44 then monitors the data track on the ICM tape 15 through the tone decoder 140 (FIG. 2) while the tape is fast forwarded. If a blank is immediately encountered (283) which is greater than one second in duration (284), then all the messages have probably been already played and the remaining ICM tape is blank. In which case, the ICM tape drive 16 step, (286). If no initial blank is found (283), the microcomputer 44 continues to monitor the data track of the ICM tape 15 until a blank is encountered (288).

As previously mentioned, the message identification information signals are recorded on the data track with a 10 millisecond blank or space between individual pulses and a 50 millisecond blank between numbers (or groups of pulses). In addition, a 100 millisecond blank is placed between the message number data, the message date data, and the message time data. Between messages however, a 5 second blank is recorded which marks the beginning and end of each message. Thus, until a blank space which is greater than 100 milliseconds is encountered, the ICM recorder 16 is still in the middle of a message. Accordingly, when a blank in excess of 100 milliseconds is encountered, the transfer mechanism is deactuated (290), returning the ICM tape drive 16 to playback mode and the playback LED 282 is lit. Since the maximum duration of a blank on the data track within a message is 100 milliseconds (see FIG. 4), then any blank in excess of 100 milliseconds on the data track unambiguously indicates the end (or beginning) of a message (see FIG. 5).

On the message track, however, relatively long blanks are often recorded within a message as the caller pauses between words while dictating. Thus, previous devices which monitor the message track for the end of the message can be confused by these pauses. The blank duration of 100 milliseconds between message data types and the blank duration of 5 seconds between entire messages on the data track are provided for purposes of illustration only. Of course, other durations may be substituted for those described for the illustrated embodiment. In addition, if the message data is not desired, a single continuous audio tone may be recorded on the data track while a message is recorded on the message track, with a blank placed in the data track to mark the end of the message.

As previously mentioned, the incoming message tapes are frequently used over and over such that new messages are recorded over old messages. Furthermore, the user, after playing back messages, may set the answering device in the answer mode before the ICM tape drive 16 has reached the end of a particular message. It is undesirable to start the recording of a new message in the middle of an old prerecorded message since the data tracks for the two messages would run together. In order to prevent this, the microcomputer 44 sets a "midway position" flag whenever the ICM tape drive 16 is stopped at any location other than the end of the message. In the illustrated embodiment, the end is marked by a a 5 second blank on the data track. This flag is also set whenever a tape is initially loaded.

Figure 12:
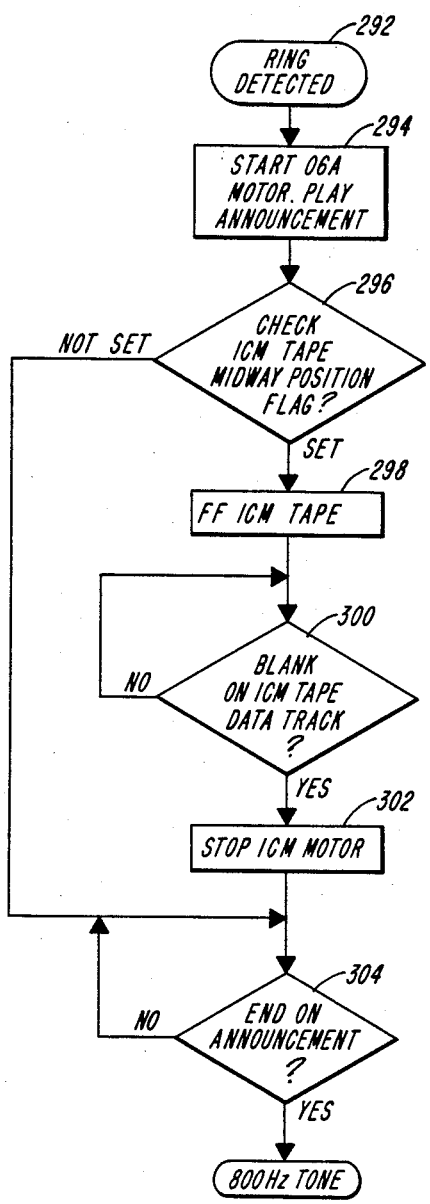
FIG. 12 is a flow chart describing the play of the outgoing announcement (OGA) of the telephone answering device of FIG. 1.

Referring now to FIG. 12, a flow chart describing the initial operation of the microcomputer 44 when a call is received by the answering device 10 is shown. When the microcomputer 44 detects an incoming call (292) from the ring detector 54 (FIG. 2), the microcomputer 44 starts the OGA motor of the OGA tape drive 14 to begin playing the announcement (294). If the midway position flag is set (296) (indicating that the ICM tape 15 of the ICM tape drive 16 is stopped at a position other than at the end of a message), the ICM tape 15 is fast forwarded (298) until the blank (in excess of 100 milliseconds) on the data track at the end of the message is encountered (300). The ICM tape drive 16 is then stopped (302). The ICM tape 15 of the ICM recorder 16 is now in position to record the new incoming message. In addition, there is a blank in excess of 100 milliseconds on the data track separating the message identification information of the old message from the message identification information of the new message.

With the ICM tape 15 positioned at the end of the old message, the microcomputer 44 waits for the end of the announcement (304) recorded on the OGA tape 13. As previously mentioned, an 800 hertz tone reorded on the OGA tape marks the end of the announcement. When the 800 hertz tone is detected by the tone decoder 78 (FIG. 2) the recording of the incoming message is started as described in FIG. 8.

The above described feature is also applicable to other "end of message" descrimination systems. For example, other answering devices may monitor the message track for pauses of a predetermined length to locate the end of the message.

Referring now to FIG. 1, most of the answering device 10 functions such as stop, rewind, fast forward, cue, next message, etc., can be controlled from the remote control unit 30. As will be more fully explained below, as each function key of the key pad 32 of the remote control unit 30 is depressed, a digital function code is transmitted from the speaker 36 (FIG. 2), over the telephone line 12 and into the answering device 10 where it is decoded and implemented. However, before the answering device 10 will accept and implement function codes from a remote control unit, the correct digital security code must be transmitted by the control unit to the answering device 10. In the illustrated embodiment, the remote control unit 30 automatically transmits the security code when an "ON/OFF" key 310 is moved to the "on" position.

When the answering device 10 receives a security code from a remote control unit, the microcomputer 44 compares the transmitted security code with an expected security code which is stored in the RAM 48. Accordingly, when the remote control unit 30 is set or programmed for a particular security code, it is very important that the security code be accurately set so that the answering device 10 will recognize the user's remote control unit. Thus, if the user decides to change the security code, then it is quite important that the security codes stored by the answering device 10 and the remote control unit 30 are changed to the same code. In order to insure this, a cable 42 is provided to connect the remote control unit 30 to the answering device 10 when the user enters a new security code. As will become more clear in the following description, when the user changes the expected security code of the answering device 10, the same security code which the remote control unit 30 will transmit is automatically changed to the new expected security code of the device 10.

To enter a new security code, the user presses a "CODE" key 312 on the front of the answering device 10. The new security code is then entered into the display 18 by pressing and releasing the switches 152 and 160 in the same manner as the entry of a message number for playback as earlier described. When the desired new security code appears in the display 18, the enter key 162 is depressed causing the microcomputer 44 to input the new security code and store it in the RAM 48 (FIG. 2). The answering device 10 will now respond only to remote control units which first transmit the new security code.

The answering device 10 has an input line 314 (FIG. 2) connected to a security code output line 316. Through the input line 314, the microcomputer 44 is able to detect when the cable 42 is connected between the answering device 10 and the remote control unit 30. In the illustrated embodiment, the remote control unit 30 also has a microcomputer 318 which in turn has a program read only memory (or ROM) 320 and a random access memory (RAM) 322. The cable connector 42 is connected to a driver 324 which is connected to an input of the microcomputer 318.

Figure 13:
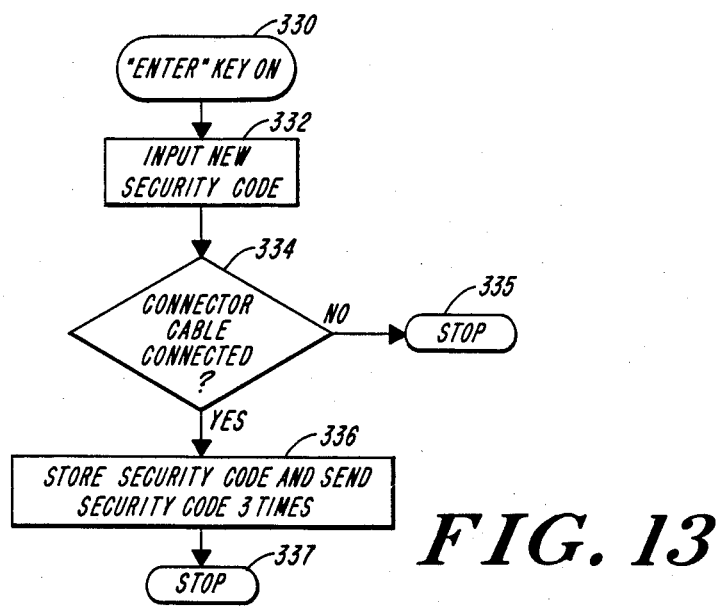
FIG. 13 is a flow chart describing the entry of a new security code into the telephone answering device of FIG. 1.

Referring now to FIG. 13, a flow chart is shown which describes the manner in which the microcomputer 44 automatically transmits the new security code to the microcomputer 318 of the remote control unit 30. When the microcomputer 44 senses that the enter key 162 has been depressed (320), the microcomputer 44 inputs the new security code (332) indicated in the display 18. (The microcomputer 44 detects the earlier closing of the code key 312 in order to distinguish the entering of a new security code from the entering of a message number, date set or time set with the mode key 150.) If the microcomputer 44 senses through the input line 314 that the connector cable 42 has been connected (334) between the answering device 10 and the remote control unit 30, the microcomputer 44 stores the new security code in the RAM 48 and transmits the new security code (336) three times over the connector cable 42 to the microcomputer 318 via the driver 324.

FIG. 7A illustrates a waveform representing the format in which a digital security code may be sent to the remote control unit 30. The waveform has four groups of pulses, each of which represents a digit. In the coding scheme of the illustrated embodiment, a digit is represented by a corresponding number of digital pulses. Thus, the example shown in FIG. 7A represents the security code "1234". This is repeated three times.

Figure 14:
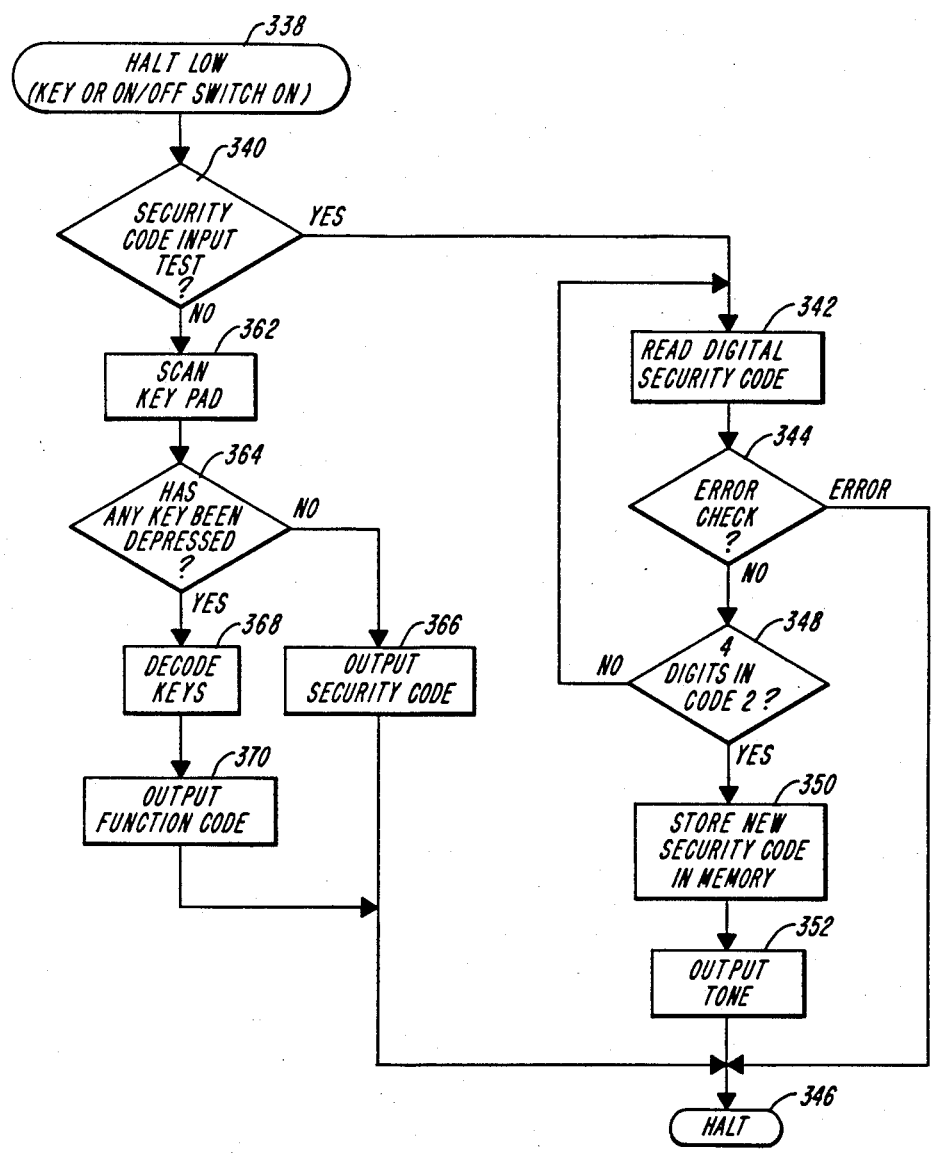
FIG. 14 is a flow chart describing the operation of the remote controller for the telephone answering device of FIG. 1.

The flow chart shown in FIG. 14 describes the manner in which the microcomputer 318 of the remote control unit 30 inputs the new security code transmitted by the microcomputer 44 of the answering device 10. If a key of the key pad 32 is depressed or the on/off switch 310 is moved to the "on" position, the microcomputer 318 is activated (338) (i.e. removed from the "halt" status). If the output from the driver 324 indicates that the connector cable 42 is connected to the remote control unit 30 (340), the microcomputer 318 reads the digital security code (342) transmitted three times from the microcomputer 44 in the answering device 10. Since the security code is transmitted three times, the microcomputer 318 can compare the three examples of the security code to see if the three examples agree (344). If the three codes do not agree, that is, are not identical, then the new security code entered is ignored (346). However, if the three security codes do agree, then they are further examined (348) to insure that each has four digits. If the codes pass this error check, the microcomputer 318 stores the new security code (350) into the RAM 322 of the microcomputer 318. In addition, a tone from the speaker 36 (FIG. 2) is outputted (352) to indicate to the user that the security code has been accepted.

In this manner, a new security code entered into the answering device 10 is automatically entered into the remote control unit 30. In addition, an error check is performed to insure that no error has occurred in the transmission of the security code. Thus, it is seen that a new security code may be reliably entered into both the answering device 10 and the remote control unit 30 to insure that the answering device 10 will respond to the remote control unit 30.

In order to use the remote control unit 30, the user first dials the telephone number of the answering device 10. When the device 10 responds by playing the announcement from the OGA tape drive 14, the user places the speaker 36 of the remote control unit 30 against the mouth piece of the hand set of the telephone. The remote control unit 30 is then turned on by placing the on/off switch 310 (FIG. 2) to the "on" position. This causes the microcomputer 318 to transmit the security code stored in the RAM 322 to the answering device 10.

After the security code is transmitted, if any function key of the key pad 32 is depressed, the remote control unit 30 will transmit the function code for that function key to the answering device 10 to be carried out. For example, if the playback key 134a is depressed, the remote control unit 30 will transmit the function code for playback to the answering device 10. If the correct security code has been transmitted by the remote control unit 30, the answering device 10 will automatically rewind the ICM tape and begin playing back the recorded messages.

The remote control unit 30 has an oscillator 360 connected to an output of the microcomputer 318. The output of the oscillator 36 is modulated by the security code and function codes outputted by the microcomputer 318 for transmission over the telephone line 12. The output of the oscillator 360 is connected to the speaker 36 which is placed against the mouthpiece of the telephone.

Figure 6A:
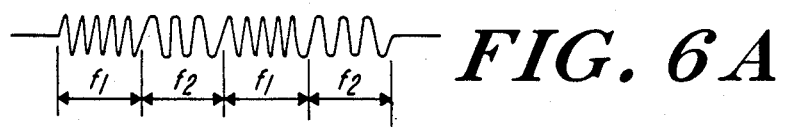
FIGS. 6A-6C illustrate the demodulation of frequency shift key modulated digital information.

In the illustrated embodiment, the digital security code and function codes of the remote control unit 30 are transmitted over the telephone line using the frequency shift key technique. This technique is illustrated in FIG. 6A. To transmit a logical one, the oscillator 360 produces an audio tone at a frequency $f_1$ and produces a second audio tone at a second frequency $f_2$ to transmit a logical zero.

Figure 6B:
Figure 6C:
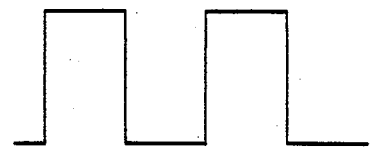

Referring back to FIG. 2, the modulated code signals from the remote control unit 30 are received over the telephone line 12 and amplified and filtered by the filter 38 which attenuates or substantially removes the second audio tone (at the frequency $f_2$) from the transmitted modulated code signals as shown in FIG. 6B. The tone decoder 40 responds to the first audio tone (at frequency $f_1$) to output a logical one and otherwise outputs a logical zero, to produce two pulses as shown in the example of FIG. 6C.

In the illustrated embodiment, the security codes are transmitted over the telephone line 12 in the same format as when transmitted over the cable 42. Thus, except for the modulation of the pulses for transmission over the telephone lines, FIG. 7A is a representative example of the format and digital coding scheme for both. Other formats and coding schemes such as BCD are, of course, possible.

The functions are digitally coded and modulated for transmission in a similar manner. However, the function codes have a single number in the illustrated embodiment. An example of a possible assignment scheme for 10 answering device functions is detailed in the following table:

TABLE

| Number of Pulses | Function | Number of Pulses | Function |
| --- | --- | --- | --- |
| 1 | PLAYBACK | 6 | FAST FORWARD |
| 2 | STOP | 7 | CUE |
| 3 | BACK SPACE | 8 | ANSWER SET |
| 4 | NEXT MESSAGE | 9 | ANNOUNCE CHANGE |
| 5 | REWIND | 10 | ANNOUNCE RECORD |

Thus, for example, when the "stop" function key 361 is depressed on the remote control unit 30, two pulses are outputted by the microcomputer 318 as shown in FIG. 7B. Each function code is preceeded and followed by a 150 millisecond pulse as shown in FIG. 7B.

The pulses from the microcomputer 318 are modulated by the oscillator 360 and transmitted to the telephone line 12 by the speaker 36 The modulated function code is filtered by the filter 38 and demodulated by the tone decoder 40 back to the unmodulated form shown in FIG. 7B. The two pulses are inputted by the microcomputer 44 which decodes or recognizes the two pulses to represent the "stop" function The microcomputer 318 accordingly stops the ICM tape drive 16. It is clear from the foregoing that additional functions may be easily controlled by merely adding additional function code numbers without having to add additional tone decoders such as the tone decoder 40.

The remote control of the functions is described in greater detail in the flow chart of FIG. 14. As previously mentioned, the microcomputer 318 of the remote control unit is activated by depressing a key or turning on the remote control unit 30 (338). If the security code connector cable 42 is not connected to the remote control unit 30 (340) the microcomputer 318 scans the key pad 32 (362). If no function key has been depressed (364) (indicating that instead the on/off switch was switched to the "on" position), the microcomputer 318 transmits the security code stored in RAM 322 (366) to the answering device 10. However, if a function key has activated the microcomputer 318 (364) the microcomputer 318 determines which function key was depressed (368) and outputs the corresponding function code (370) to the answering device 10.

Figure 15:
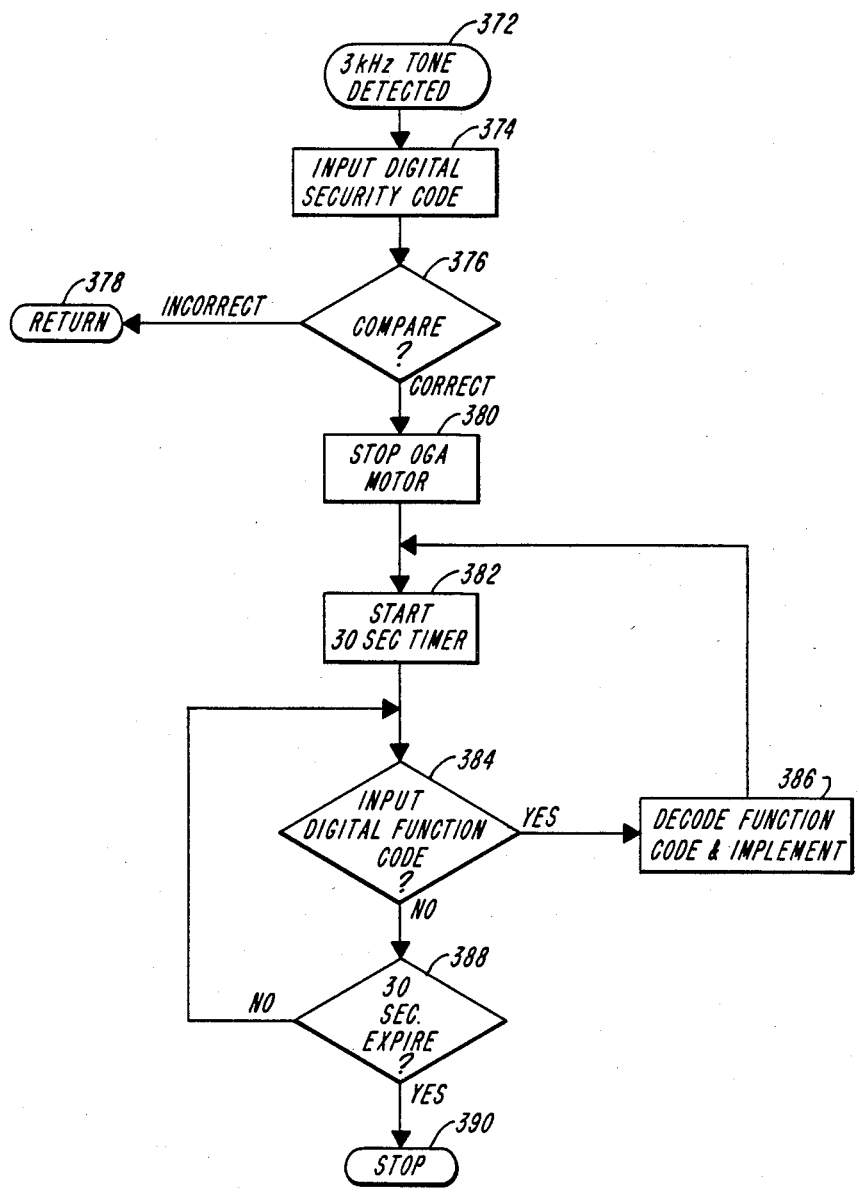
FIG. 15 is a flow chart describing the operation of the telephone answering device of FIG. 1 upon receipt of a security code or a function code.

In the illustrated embodiment, the frequency of the logical one audio tone, $f_1$, is 3 kilohertz. Accordingly, the tone decoder 40 outputs a logical one (or pulse) when a 3 kilohertz tone is inputted into the tone decoder 40. Referring now to FIG. 15, when the 3 kilohertz tone is initially detected (372), the microcomputer 44 of the answering device 10 inputs the digital security code (374) transmitted from the remote control unit 30 and demodulated by the filter 38 and tone decoder 40 (FIG. 2). (In order to prevent the inadvertent activation of the tone decoder 40, the filter 70 filters out any 3 kilohertz tones from the outgoing announcement). The microcomputer 44 compares (376) the inputted digital security code from the remote control unit 30 with the expected security code which is stored in the RAM 48. If the incorrect security code has been transmitted, the microcomputer 44 ignores (378) any function codes transmitted from that control unit (378). However, if the correct security code has been transmitted (376), the microcomputer 44 stops (380) the outgoing announcement tape drive 16 which stops the play of the announcement. The microcomputer 44 then starts a 30 second timer (382). If the remote control unit 30 transmits a function code (384) within the 30 second limit, the function code is decoded (386) and implemented. The microcomputer 44 then waits for another 30 seconds for another digital function code to be transmitted. If no function code is received within the 30 second time limit (388), the microcomputer 44 stops (390).

It will, of course, be understood that modifications of the present invention, and its various aspects will be apparent to those skilled in the art, some being apparent only after study and others being merely matters of routine electronic design. Other embodiments are also possible, with their specific designs dependant upon the particular application. For example, many of the above described features are equally applicable to dictation equipment. In addition, the control elements are implemented with a programmed microcomputer in the illustrated embodiment. Dedicated logic can, of course, be substituted for these functions. As such, the scope of the invention should not be limited by the particular embodiment herein described, but should be defined only by the appended claims and equivalents thereof.

We claim:

1. A telephone answering device for receiving incoming messages, comprising:

message counter means for assigning a unique message number to an incoming message and providing digital signals representative of the message number;

processor means;

recorder means having a recording medium which includes first and second tracks and means controlled by the processor means and responsive to the digital signals provided by the message counter means for recording signals representing an incoming message on the first track and the digital signals on the second track;

playback means controlled by the processor means, for playing back incoming messages recorded on the first track and for simultaneously reading back the digital signals recorded on the second track and transmitting the digital signal to the processor means while the message recorded on the first track is being played back;

a user manipulable input for designating a selected message number;

means responsive to said selected message number, for controlling the playback means to automatically locate on the recording medium the beginning of the selected message recorded on the first track which corresponds to the selected message number; and means for replaying the message corresponding to the selected message number.

2. The device of claim 1 further comprising a user manipulable input for providing a playback signal, the processor means further having a memory for storing the message number of the first message recorded, and the processor means having means responsive to the playback signal, for controlling the playback means to automatically locate the beginning of the first message recorded and for replaying the first message.

3. The device of claim 2 wherein the processor means further comprises means for storing the message number of the last recorded message, and the processor playback control means is responsive to the last message number to stop the playback after the message corresponding to the last message number has been replayed.

4. The device of claim 1 further comprising a user manipulated input means for providing a cue signal, the recorder means being responsive to the cue signal for replaying a selected message, and a processor cue memory means for storing the message number of a message being played back in response to a cue signal.

5. The device of claim 4 wherein the processor means further comprises means for controlling the playback means to automatically locate on the recording medium in response to a cue signal the beginning of the cued message corresponding to the message number stored in the cue memory and to play back the cued message.

6. In an telephone answering device in which a sequential number identifying each message is recorded on an incoming message tape along with the incoming message, an apparatus for selectively playing back a selected one or more of the messages, comprising:
    message number storage means for storing selected message numbers;
    first playback means for audibly playing back recorded messages;
    switch means, operative by a user during message playback, for enabling the storage in the storage means of the number of the message currently being played back when the user actuates the switch means; and
    second playback means operative when an initial message playout is completed, for selectively playing back a second time, only those messages having numbers corresponding to those stored.

7. A telephone answering device comprising:
    message counter means for assigning a unique message number to an incoming telephone message and for providing digital signals representative of the assigned message number;
    recorder means having a magnetic tape which has a message track and a data track, for recording incoming messages on the message track and for recording the message number digital signals on the data track;
    playback means for playing back the messages and message number digital signals;
    a cue input for user cue input signals for the user to select a message being played back for later replay;
    processor means responsive to the counter means, for transferring the digital signals representing the message number assigned to a particular incoming message to the recorder means to be recorded on the data track as that particular message is being recorded on the message track, said processor means further having a cue memory and means responsive to a cue input signal, for storing the message number of the message being played back by the playback means into the memory and means for controlling the playback means to play back the messages selected by the user.

8. The device of claim 7 wherein the message numbers are assigned sequentially to the messages as the messages are recorded, the processor means further comprising comparison means for comparing the message number of the current message played with the message number stored in the cue memory and control means responsive to the comparison means for controlling the playback means to move the tape back if the message number of the current message played is greater than the message number stored in the cue memory and to move the tape foward if the message number of the current message played is less than the message number stored in the cue memory, wherein the tape is moved to the beginning of the message corresponding to the message number stored.

9. The device of claim 8 wherein the digital signals are recorded substantially continuously on the data track as the message is being recorded on the message track, said processor means further having means for providing no modulation signal to the recording means at the end of a message for a predetermined period of time forming a blank on the data track at the end of each message recorded on the message track to mark the end of one message and the beginning of the subsequent message, said comparison means further having means for computing the difference between the message number of the current message played and the cued message number stored in the cue memory to determine the number of messages between the current message played and the message corresponding to the message number stored in the cue memory and the processor control means having means responsive to the playback means for counting the number of blanks on the data track as the tape is moved to locate the beginning of the message corresponding to the message number stored in the cue memory.

10. The device of claim 7 wherein the processor means has a second memory for storing the message number of the last message recorded on the message track and control means responsive to the playback means for comparing the message number of the message being played back with the message number stored in the second memory and for stopping the playback means after completion of playback of the message having the message number stored in the second memory.

11. In a telephone answering device in which message numbers are assigned sequentially and recorded on an incoming message tape as incoming messages are recorded on the incoming message tape, the improvement comprising:
    means for storing the message number of the first message to be recorded after the telephone answering device is enabled to receive and record incoming messages;
    playback switch means for the user to initiate playback of the recorded messages; and
    means responsive to the playback switch means, (1) for determining the difference between the last message number recorded before playback is initiated and the first message number stored, (2) for rewinding the tape, (3) for counting the messages as the tape is rewound, and (4) for starting playback at the beginning of the first message.

12. A telephone answering device comprising:
    message counter means for assigning a unique message number to an incoming telephone message and for providing digital signals representative of each message number;
    recorder means having a magnetic tape which has a message track and a data track, for recording incoming messages on the message track and for recording the message number digital signals on the data track;
    processor means, responsive to the counter means, for transferring the digital signals representing the message number assigned to a particular incoming message to the recorder means to be recorded on the data track as that particular message is being recorded on the message track;

playback means for playing back the messages and message number digital signals; and a message number input for a user to input a message number of a message for playback;

said processor means further having a memory and means responsive to the message number input for storing the selected message number into the memory and control means responsive to the message number stored in the memory for controlling the playback means to move the tape to the beginning of the message corresponding to the message number stored in memory for replay.

13. A telephone answering device comprising:

message counter means for assigning a unique message number to a incoming telephone message and for providing digital signals representative of each message number;

recorder means having a magnetic tape which has a message track and a data track, for recording incoming messages on the message track and for recording the message number digital signals on the data track;

processor means, responsive to the counter means, for transferring the digital signals representing the message number assigned to a particular incoming message substantially continuously to the recorder means to be recorded on the data track as that particular message is being recorded on the message track and for providing no signal to the recorder means for a predetermined period upon completion of the message so that a blank is recorded on the data track to indicate the end of the message recorded on the message track;

playback means for playing back the messages on the message track and the signals on the data track; and detector means responsive to the playback means for detecting the end of message blank on the data track.

14. The device of claim 13 wherein the processor means further has a memory and means for storing the message number of the first message recorded and the message number of the last message recorded in the memory, said device further having a user input to provide a user input signal to initiate playback of the recorded messages, said processor further having means for comparing the message numbers of the first and last recorded messages to determine the number of messages between the last message and the first message, and means responsive to the comparison means, the detector means and the playback signal for controlling the playback means to move the tape back the number of messages determined by the comparison means to return the tape to the beginning of the first recorded message to begin playback.

15. The device of claim 13 further comprising a user input for the user to provide a next message input signal to skip the playback of a message, said processor having control means responsive to the next message input signal and the detector means, for controlling the playback means to fast forward move the tape in response to a next message user input signal until the detector means detects the end of the message so that the playback means can then play back the next message thereby skipping over the present message being played when the next message signal was inputted.

16. In a telephone answering device in which incoming messages are recorded on a first track of a tape and message identification signals are recorded on a second track of the tape with blanks on the second track separating message identification signals for different messages such that the blanks mark the end and beginning of adjacent messages, the improvement comprising:

first means for determining whether the tape has been stopped in the middle of a pre-recorded message; and second means, responsive to the first means, for advancing the tape to the end of a message when it is determined that the tape had been stopped in the middle of a message before the recording a new message is initated wherein the initiation of recording of a new message in the middle of an old message is prevented.

17. The device of claim 16 wherein the first means includes:

detector means for detecting the blanks marking the end and beginning of adjacent messages, while the tape is moving;

flag means for indicating, when set, that the tape is stopped in the middle of a message; and processor means, responsive to the detector means, for setting the flag when the tape is stopped while a blank is not being detected.

* * * * *